United States Patent
Blanchard et al.

(10) Patent No.: US 12,441,146 B2
(45) Date of Patent: Oct. 14, 2025

(54) STRUT BEARING UNIT FOR A MOTOR VEHICLE

(71) Applicant: AKTIEBOLAGET SKF, Gothenburg (SE)

(72) Inventors: Xavier Blanchard, Saint-Cyr-sur-Loire (FR); Jordan Renaudon, Saint-Cyr-sur-Loire (FR); Bruno Montboeuf, Saint-Cyr-sur-Loire (FR); Paul Rabourdin, Chambray lès Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 51 days.

(21) Appl. No.: 18/632,665

(22) Filed: Apr. 11, 2024

(65) Prior Publication Data

US 2024/0352963 A1    Oct. 24, 2024

(30) Foreign Application Priority Data

Apr. 18, 2023  (CN) .......................... 202310415146.1

(51) Int. Cl.
*F16C 19/16* (2006.01)
*B60G 13/00* (2006.01)
(Continued)

(52) U.S. Cl.
CPC .......... *B60G 13/003* (2013.01); *B60G 15/068* (2013.01); *F16C 19/16* (2013.01);
(Continued)

(58) Field of Classification Search
CPC .......... F16C 19/10; F16C 19/14; F16C 19/16; F16C 19/163; F16C 35/04; F16C 35/042;
(Continued)

(56) References Cited

U.S. PATENT DOCUMENTS 10,723,194 B2 * 7/2020 Montboeuf .......... B60G 15/068
2012/0292841 A1 * 11/2012 Corbett ................ B60G 15/068
384/609

(Continued)

FOREIGN PATENT DOCUMENTS

DE    102017208997 A1 * 11/2018 ............ F16C 33/767
DE    102020202617 A1 *  9/2021 ............ B60G 15/067
(Continued)

*Primary Examiner* — Phillip A Johnson
(74) *Attorney, Agent, or Firm* — J-TEK LAW PLLC; Scott T. Wakeman; Mark A. Ussai

(57) ABSTRACT

A strut bearing unit for a motor vehicle includes a lower cup for supporting a suspension spring, an upper cup for coupling with a top mount which provides a connection to a chassis of the motor vehicle, and a bearing interposed between the upper cup and the lower cup. The upper cup has an inner cylindrical surface and a first set of protruding ribs formed on the inner cylindrical surface for providing a connection between the top mount and the upper cup. The first set of protruding ribs extends axially and is circumferentially distributed around the inner cylindrical surface. Each rib of the first set of protruding ribs has a first axial portion and a second axial portion, the first axial portion and the second axial portion having different thicknesses in the radial direction.

11 Claims, 2 Drawing Sheets

(51) Int. Cl.
  *B60G 15/06*   (2006.01)
  *F16C 35/04*   (2006.01)
(52) U.S. Cl.
  CPC ...... *F16C 35/042* (2013.01); *B60G 2204/128* (2013.01); *B60G 2204/418* (2013.01); *F16C 2326/05* (2013.01)
(58) Field of Classification Search
  CPC . F16C 2326/05; B60G 13/003; B60G 15/068; B60G 2204/128; B60G 2204/418
  See application file for complete search history.

(56) References Cited

U.S. PATENT DOCUMENTS

| | | | |
|---|---|---|---|
| 2014/0010491 A1* | 1/2014 | Lutz | F16C 33/761 384/607 |
| 2018/0335089 A1* | 11/2018 | Shaikh | G01B 21/16 |
| 2021/0222732 A1* | 7/2021 | Blanchard | F16F 9/54 |
| 2022/0203790 A1* | 6/2022 | Hilbinger | B60G 15/068 |

FOREIGN PATENT DOCUMENTS

| | | | | |
|---|---|---|---|---|
| FR | 3101279 A1 * | 4/2021 | | F16C 19/10 |
| KR | 20160143672 A * | 12/2016 | | B60G 15/068 |

\* cited by examiner

STRUT BEARING UNIT FOR A MOTOR VEHICLE

CROSS-REFERENCE

This application claims priority to Chinese patent application no. 202310415146.1 filed on Apr. 18, 2023, the contents of which are fully incorporated herein by reference.

BACKGROUND OF THE INVENTION

The present invention relates to bearings, and more particularly to a strut bearing unit for a motor vehicle.

An automobile suspension system typically includes a support strut which supports an axle and a wheel of a vehicle. A strut bearing unit or suspension bearing unit is disposed in the upper part of the support strut, opposite to the wheel and the ground, between a suspension spring and an upper member, a so called "top mount", that is either integral with the chassis of the vehicle or is mounted to the chassis of the vehicle. Such a strut bearing unit is adapted for transmitting axial forces between the suspension spring and the chassis of the vehicle. The strut bearing unit consists of a lower cup, an upper cup and a bearing arranged between the lower and upper cups.

In known suspension systems, the upper cup of the strut bearing unit needs to be connected with the top mount. It is essential to provide a secure, non-rotating connection while maintaining the capability of relative angular movement between the rings of the bearing, which are arranged between the upper and lower cups of the strut bearing unit. The connection between the upper cup of the strut bearing unit and the top mount may be achieved using an interference fit between these two components. The elements used for such an interference fit may be in the form of bosses on the upper cup, which are able to clamp the top mount to the upper cup. However, these bosses may make insertion of the top mount into the inner bore of the upper cup somewhat difficult.

SUMMARY OF THE INVENTION

An object of the present invention is to provide a strut bearing unit facilitating connection with a top mount while ensuring a reliable connection therebetween.

This object is solved by a strut bearing unit for a motor vehicle, the strut bearing unit comprising a lower cup configured to support a suspension spring, an upper cup configured to couple with a top mount integrally formed with or connect to a chassis of the motor vehicle, and a bearing disposed between the upper cup and the lower cup. The upper cup has an inner cylindrical surface and a first set of protruding ribs formed on the inner cylindrical surface for providing a connection between the top mount and the upper cup. The first set of protruding ribs extends axially and is circumferentially distributed around the inner cylindrical surface, each rib of the first set of protruding ribs having a first axial portion and a second axial portion. The first axial portion and the second axial portion each have a radial thickness direction, the radial thickness of the first axial portion being different than the radial thickness of the second axial portion.

The strut bearing unit of the present invention, also called a suspension bearing unit, may be of the MacPherson type (i.e., a MacPherson suspension bearing unit or "MSBU"). As described above, the strut bearing unit may be disposed in the upper part of the support strut, opposite the wheel and the ground, between a suspension spring and an upper member, the upper member being referred to in the following description as a "top mount". The top mount may either be formed integral with the chassis of the vehicle or may be a separate component which is mounted to or connected with the chassis of the vehicle.

As mentioned above, the strut bearing unit basically includes a lower cup configured to support the suspension spring, an upper cup configured to couple with the top mount, thereby providing a connection to a chassis of the motor vehicle, and a bearing interposed or disposed between the upper cup and the lower cup.

In order to provide a secure and stable connection between the upper cup and the top mount, the upper cup has an inner cylindrical surface and at least a first set of protruding ribs formed on the inner cylindrical surface for providing a connection between the top mount and the upper cup. The first set of protruding ribs extends axially (i.e., along a central axis of the upper cup) and is circumferentially distributed around the inner cylindrical surface of the upper cup so as to be spaced about the central axis. Each rib of the first set of protruding ribs has a first portion and a second portion in the axial direction, i.e., a first axial portion and a second axial portion, wherein the first portion and the second portion have different thicknesses in the radial direction (i.e., radially with respect to the central axis). Preferably, the radial thickness of the first, upper axial portion of each rib is less than the radial thickness of the second, lower axial portion of each rib.

On the one hand, the first set of protruding ribs provides a secure connection between the upper cup and the top mount (i.e., by frictional engagement of the ribs with an outer cylindrical or circumferential surface of the top mount), and on the other hand, provides an easy assembly of the top mount onto the upper cup. Due to the different thicknesses of each protruding rib in the axial direction, the top mount may easily be inserted into the upper cup due to the smaller thickness (i.e., of each first section) and may then be clamped (i.e., by frictional engagement) due to the greater thickness of each second section. Thus, in contrast to the upper cup of previously known strut bearing units, the upper cup of the present strut bearing unit provides a simplified assembly of the top mount to the upper cup while ensuring a secure connection between the upper cup and the top mount during use.

According to an embodiment of the present invention, the first portions of the first set of protruding ribs have a thickness which is dimensioned for centering the top mount during assembly. In particular, the first portions have a smaller or lesser thickness than the second portions for facilitating the insertion of the top mount into the inner surface of the upper cup. The first portions may also have a thickness increasing in the axial direction so that the top mount may first come in contact with the first portions of the first set of protruding ribs in the region of a relatively small or lesser thickness and may then be slid onto the first portions and into the upper cup over the increasing, greater thickness. Such a rib structure ensures a relatively easy assembly of the top mount and the strut bearing unit.

According to a further embodiment, the second portions of the first set of protruding ribs each have a thickness which is dimensioned for fastening or connecting the top mount in a non-rotating manner after assembly. In addition, loading may be transmitted from the top mount to the upper cup, and thus to the strut bearing unit, by means of the second portions of the first set of protruding ribs.

After being slid onto the first portions of the ribs, the top mount may be further inserted onto the first set of protruding ribs until the top mount contacts the second portions of the first set of protruding ribs. As the second portions have a greater thickness than the first portions, the top mount may then be clamped between, and frictionally engaged with, the second portions of the first set of protruding ribs. In particular, after assembly of the top mount into the upper cup, the second portions of the first set of protruding ribs provide an interference fit with the top mount. Such a connection provides a relatively easy method of assembling the top mount by first sliding the top mount over the first portions having a smaller or lesser thickness, thus facilitating the centering and insertion of the top mount, and then by clamping the top mount using the second portions of the first set of protruding ribs.

The thickness of the first set of protruding ribs may gradually increase or taper starting at a free, upper end of each rib first portion and ending at a free, lower end of the rib second portion. Alternatively, the thickness of each rib may increase in a step-like manner from the first portion to the second portion, either with a stair-like step or with an inclined, gradually increasing step (i.e., an angled portion extending between the first and second portions). In a further embodiment, the transition between the first portion and the second portion of each rib may have the form of such a step, and each one of the first and second portions may by formed having a gradually increasing thickness (i.e., increasing in a direction from the upper end of each rib portion to the lower end of each rib portion).

According to a further embodiment, the first set of protruding ribs is deformable. According to this embodiment, the first set of protruding ribs may compensate for manufacturing tolerances of the top mount as they may be deformed depending on the outer diameter of the top mount. In particular, the second portions of the first set of protruding ribs may be deformed due to the greater thickness compared to the first portions of the protruding ribs. In this case, the top mount is clamped by both of the second portions and the first portions of the ribs. When the second portions of the first set of protruding ribs are severely or substantially deformed, the load transmitted from the top mount to the strut bearing unit is not only transmitted by means of the second portions of the first set of protruding ribs, but also transmitted by means of the first portions of the first set of protruding ribs.

According to a further embodiment of the present invention, the present strut bearing unit further comprises a second set of protruding ribs formed on the inner cylindrical surface of the upper cup, the second set of protruding ribs having a shorter or lesser axial extension (i.e., axial length) than the first set of protruding ribs. In particular, the second set of protruding ribs has a thickness which is dimensioned for centering the top mount during assembly. In contrast to the first set of protruding ribs, the second set of protruding ribs mainly serves for centering the top mount during assembly. This is particularly the case as the second set of protruding ribs are preferably arranged only at the upper end of the inner surface of the upper cup, such that they center the top mount during assembly and the top mount is completely slid or displaced axially over the second set of protruding ribs. The second set of protruding ribs is preferably deformable. In particular, no loading is transmitted from the top mount to the upper cup by means of the second set of protruding ribs.

The first and/or the second set of protruding ribs may be made of plastic material. For example, the first and/or second set of protruding ribs may be formed of a polyamide with fillers (e.g., fibers), such as for example, PA6-GF or PA66-GF.

The first and/or the second set(s) of protruding ribs are preferably integrally formed with the upper cup of the strut bearing unit. For example, the upper cup may be a molded part in which the main portion of the upper cup is molded together with the first and/or the second set(s) of protruding ribs.

According to a further embodiment, the first set of protruding ribs and the second set of protruding ribs are uniformly distributed or evenly spaced around the circumference of the inner cylindrical surface of the upper cup. For example, the first set of protruding ribs and the second set of protruding ribs are arranged alternating, i.e., each rib of the first set of protruding ribs is disposed between a separate pair of adjacent ribs of the second set of protruding ribs. Such an arrangement of the two sets of ribs may provide an especially even distribution of centering elements (i.e., the first portions of the first set of protruding ribs and the second set of protruding ribs) and load transmitting/fixation elements (i.e., the second portions of the first set of protruding ribs). Alternatively, the first set of protruding ribs may be arranged in pairs (i.e., two ribs of the first set of protruding ribs are arranged next to each other) or groups (i.e., three or more ribs of the first set of protruding ribs are arranged next to each other) and the pairs or groups of the first set of protruding ribs and the second set of protruding ribs are arranged alternating. For example, a pair of the first set of protruding ribs may be arranged next to a single rib of the second set of protruding ribs, followed by a pair of the first set of protruding ribs arranged next to a single rib of the second set of protruding ribs, and so on. In any case, the pattern of the protruding ribs, independent on the order, may be uniformly distributed or spaced around the circumference of the inner surface of the upper cup.

Further preferred embodiments or features of the present invention are defined in the dependent claims as well as in the description and the figures of the present application. Thereby, elements described or shown in combination with other elements may be present alone or in combination with other elements without departing from the scope of protection.

BRIEF DESCRIPTION OF THE SEVERAL VIEWS OF THE DRAWINGS

In the following, preferred embodiments of the invention are described in relation to the drawings, wherein the drawings are exemplarily only, and are not intended to limit the scope of protection. The scope of protection is defined solely by the accompanying claims. The figures show:

DETAILED DESCRIPTION OF THE INVENTION

Figure 1:
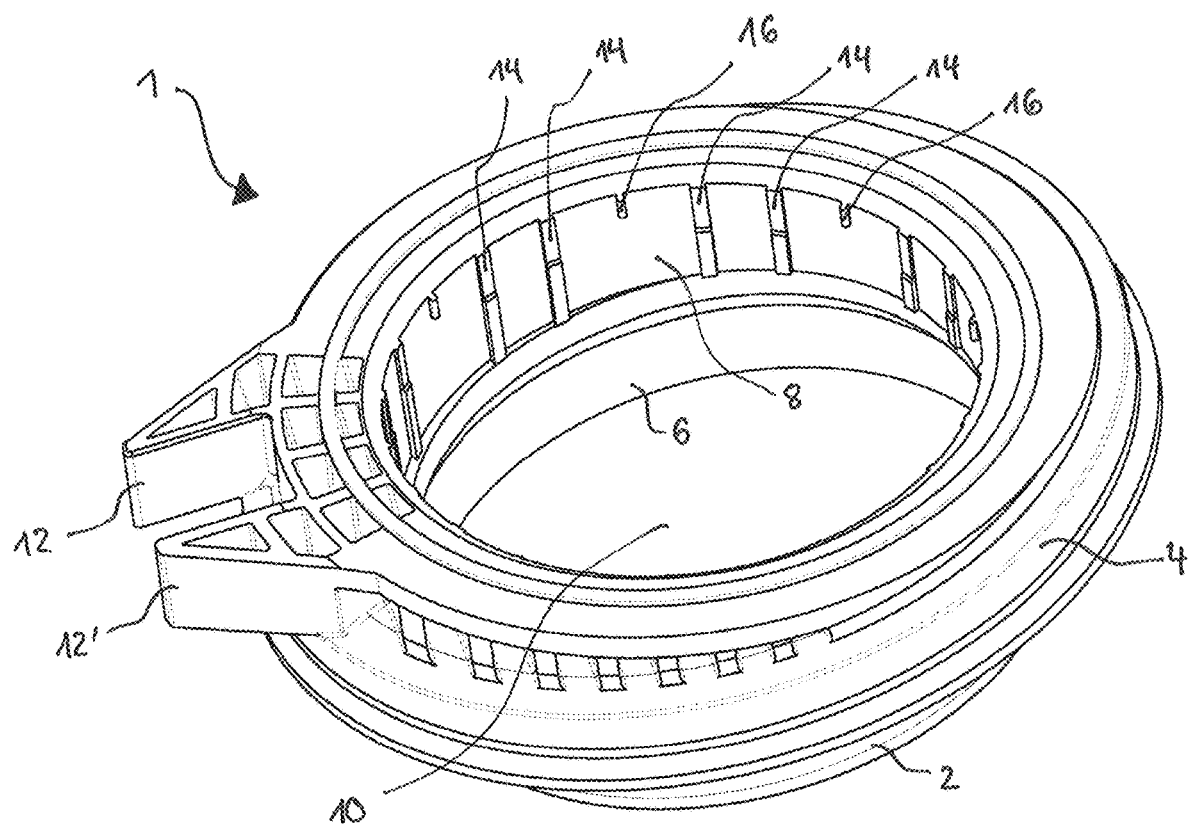
FIG. 1 is a perspective view of an exemplary strut bearing unit.

In the following description, the same or similar functioning elements are indicated with the same reference numerals.

FIG. 1 shows a strut bearing unit 1 having a lower cup 2 and an upper cup 4. Each cup 2, 4 may have the general form of a cylindrical ring (i.e., having an annular body). Between the lower cup 2 and the upper cup 4, a bearing 24 is arranged, which will be further described below with reference to FIGS. 3 and 4. Each one of the lower cup 2 and the upper cup 4 have cylindrical inner surfaces 6, 8, respectively, providing or forming a through hole 10 for accommodating a suspension strut of a motor vehicle (not shown). The upper cup 4 further comprises cantilever elements 12, 12', which may be used for holding the top mount.

Figure 3:
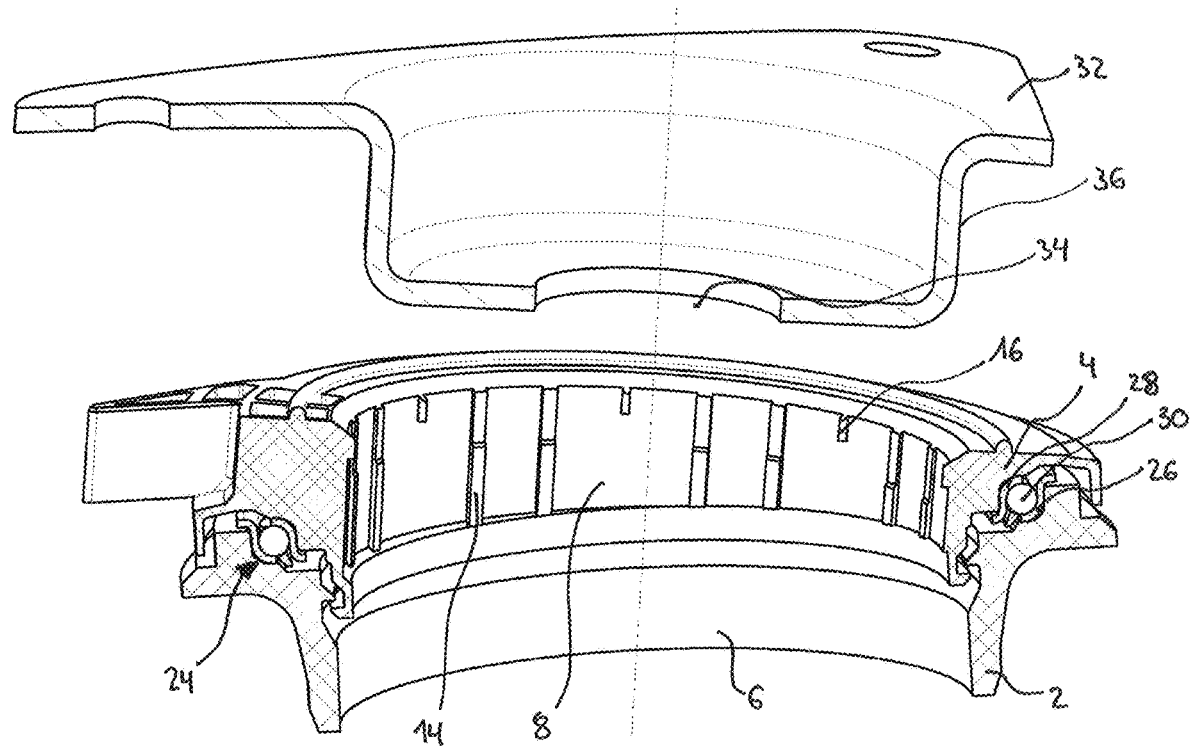
FIG. 3 is a cross-sectional view of the strut bearing unit of FIG. 1, shown with a top mount in a pre-assembled state.
Figure 4:
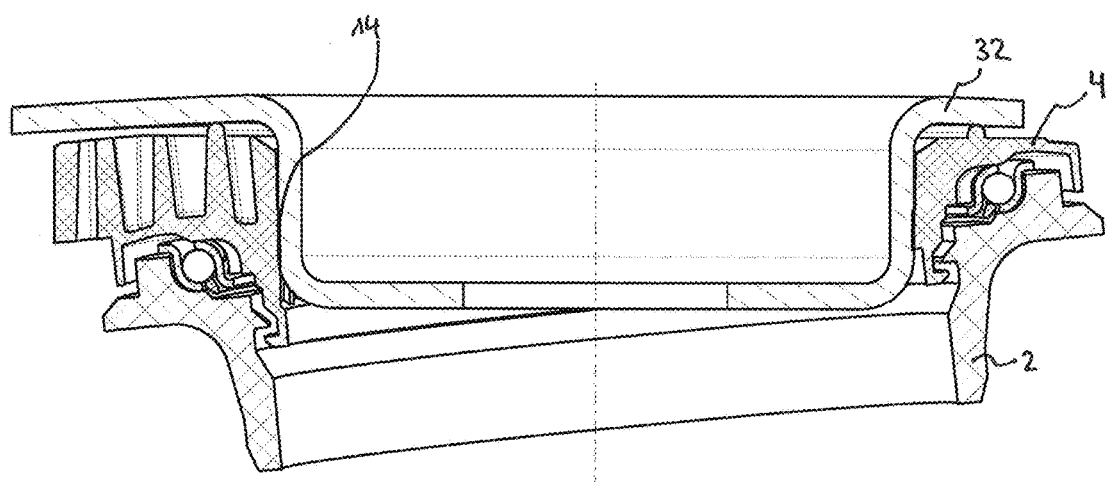
FIG. 4 is a sectional view of the strut bearing unit of FIG. 1, shown together with the top mount in an assembled state.

As shown in FIGS. 1, 3 and 4, the strut bearing unit 1 is inclined or angled to one side, i.e., the upper cup 4 is inclined/angled for supporting a relative angular movement between the rings of the bearing 24 arranged between the lower cup 2 and the upper cup 4, as described below.

The upper cup 4 may be coupled to a top mount 32 (further described in FIGS. 3 and 4), which is coupled to or integrally formed with a chassis of the motor vehicle. In order to provide both a relatively easy assembly of the top mount 32 to the strut bearing unit 1 and a reliable connection between the top mount 32 and the strut bearing unit 1, the upper cup 4 comprises a first set of protruding ribs 14 on the inner cylindrical surface 8 of the cup 4. In addition, the upper cup 4 may also comprise a second set of protruding ribs 16.

The first set of protruding ribs 14 and the second set of protruding ribs 16 are each preferably arranged around the circumference of the inner cylindrical or inner circumferential surface 8 of the upper cup 6. In the embodiment depicted in FIG. 1, the two sets of ribs 14, 16 are arranged such that two protruding ribs 14 are followed by one protruding rib 16 and so on; i.e., two ribs 14 are disposed between a separate pair of single ribs 16 and each rib 16 is disposed between a separate pair of two ribs 14. However, the two sets of ribs 14, 16 may alternatively be formed in any other desired arrangement, for example one protruding rib 14 followed by one protruding rib 16, one protruding rib 14 followed by two protruding ribs 16, three protruding ribs 14 followed by one protruding rib 16, etc.

Figure 2:
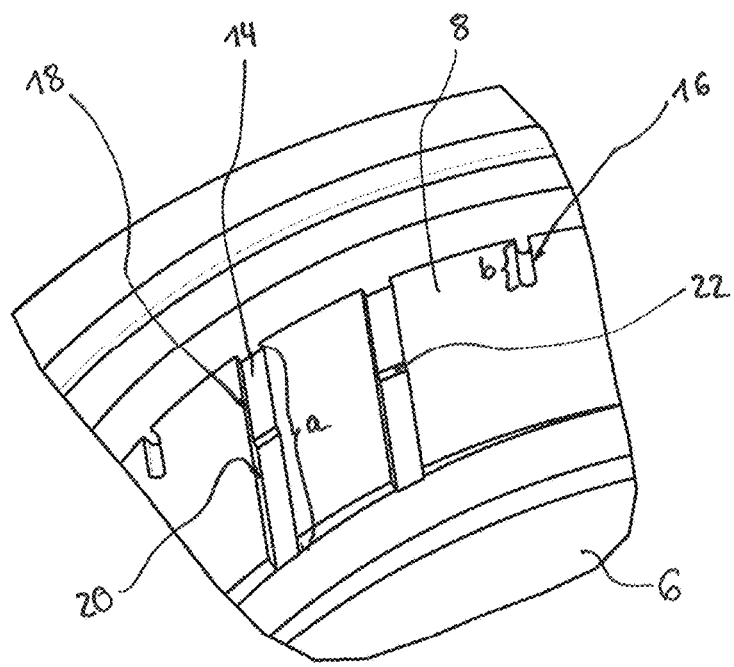
FIG. 2 is a broken-away, detailed view of a portion of the upper cup of the strut bearing unit of FIG. 1.

As shown in the enlarged section of FIG. 2, the axial extension or axial length "a" of each protruding rib 14 is greater than the axial extension or axial length "b" of the protruding rib 16. Thus, the second set of protruding ribs 16 only serves the purpose of centering the top mount 32 during assembly, but does not provide any load transmitting functionality after assembly of the top mount 32. In contrast to that, the first set of protruding ribs 14 provides both centering of the top mount 32 as well as load transmission from the top mount 32.

To provide both functions, each protruding rib 14 preferably includes a first axial portion 18 and a second axial portion 20, i.e., the first portion 18 and the second portion 20 are spaced axially along the central axis (not indicated, but shown in FIGS. 3 and 4) of the upper cup 4. As can be seen, the first portion 18 has a smaller or lesser thickness in the radial direction than a "radial" thickness of the second portion 20. The first portions 18 of the first set of ribs 14 are used for centering the top mount 32 during assembly, together with the (optional) protruding ribs 16. The second portions 20 of the first set of ribs 14 are used for clamping the top mount 32 in the upper cup 4 (i.e., by friction and/or interference) as well as for transmitting a load from the top mount 32 to the upper cup 4, and thereby to the strut bearing unit 1.

The radial thickness of the first axial portion 18 may gradually increase to the same thickness of the second axial portion 20. Alternatively, as shown in FIG. 2, a transition region 22 may be formed between the first portion 18 and the second portion 20, which as depicted is step-like, but is inclined (i.e., angled) and gradually increasing.

As shown in FIGS. 1 and 2, each protruding rib 14 may have a rectangular shape in the radial direction when viewed from above, whereas each protruding rib 16 may have a semicircular shape in the radial direction when viewed from above. However, it should be noted that these shapes are only exemplary and the protruding ribs 14 and 16 may have the same shape, e.g., both rectangular or both semicircular, each first rib 14 may be semicircular and each second rib 16 may be rectangular, and/or the ribs 14, 16 may have any other appropriate shape (e.g., triangular, partially star-shaped, semi-hexagonal, etc.).

With reference to FIGS. 3 and 4, assembly of the top mount 32 into the strut bearing unit 1 will be described in further detail. As can be seen in FIGS. 3 and 4, the strut bearing unit 1 comprises a bearing 24 arranged between the upper cup 4 and the lower cup 2. The bearing 24 has a lower, inner ring 26 in contact with the lower cup 2 and an upper, outer ring 28 in contact with the upper cup 4. Between the inner ring 26 and the outer ring 28, a plurality of rolling elements are arranged, preferably balls 30 as depicted but may be any other appropriate type of rolling element, which are spaced circumferentially about the central axis.

After assembly, the top mount 32, which as depicted herein has a general shape or form of a bowl, is arranged within the upper cup 4, wherein the outer circumference or outer circumferential surface of the top mount 32 is in contact with the upper cup 4. A through hole 34 of the top mount 32 will thereby be aligned with the through hole 10 of the strut bearing unit 1.

As described above, the second set of protruding ribs 16, as well as the first axial portions 18 of the first set of protruding ribs 14, are used for centering the top mount 32. When the top mount 32 is inserted into the upper cup 4, the protruding ribs 16, as well as the first portions 18 of the protruding ribs 14, preferably ensure that the top mount 32 is in the middle of the upper cup 4, i.e., the top mount 32 is centered about the central axis of the upper cup 4 and of the bearing unit 1, as best shown in FIG. 4.

When the top mount 32 is further inserted into the upper cup 4, the protruding ribs 16 may be deformed and the top mount 32 is slid or slidably displaced from the first portions 18 of the protruding ribs 14 to or onto the second portions 20 of the ribs 14. Due to the greater radial thickness of the second portions 20, the top mount 32 can be clamped and fixed in the upper cup 4 based on an interference fit between the second portions 20 of the protruding ribs 14 and the outer circumferential surface 36 of the top mount 32. This interference fit provides a tight fixation or connection of the top mount 32 in a non-rotating manner on one hand and a transmission of a load acting on the top mount 32 to the strut bearing unit 1 on the other hand.

The second axial portions 20 of the protruding ribs 14 may be deformed for accommodating manufacturing tolerances. In other words, the second axial portions 20 of the ribs 14 may be deformed to a greater extent when the top mount 32 has a relatively greater outer diameter and conversely, the second portions 20 may be deformed to a lesser extent when the top mount 32 has a relatively lesser outer diameter. When the second axial portions 20 are deformed to so as to have about the same thickness as the thickness of each first axial portion 18, the first axial portions 18 may also transmit a load or loading from the top mount 32 to the strut bearing unit 1.

In summary, the herein disclosed strut bearing unit 1 provides a simplified way of assembling a top mount to a strut bearing unit and for improving the fixation or connection of, as well as the load transmission between, the top mount and the strut bearing unit.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

REFERENCE NUMERALS

- 1 strut bearing unit
- 2 lower cup
- 4 upper cup
- 6 cylindrical surface
- 8 cylindrical surface
- 10 through hole
- 12, 12' cantilever elements
- 14 first set of protruding ribs
- 16 second set of protruding ribs
- 18 first portion
- 20 second portion
- 22 transition region
- 24 bearing
- 26 inner ring
- 28 outer ring
- 30 balls
- 32 top mount
- 34 through hole
- 36 outer circumferential surface
- a, b axial extension

We claim:

1. A strut bearing unit for a motor vehicle, the motor vehicle having a chassis and a top mount connected with or integrally formed with the chassis, the strut bearing unit comprising:
    a lower cup configured to support a suspension spring;
    an upper cup configured to couple with the top mount; and
    a bearing disposed between the upper cup and the lower cup;
    wherein the upper cup has an inner cylindrical surface and a first set of protruding ribs formed on the inner cylindrical surface for providing a connection between the top mount and the upper cup;
    wherein the first set of protruding ribs extends axially and is circumferentially distributed around the inner cylindrical surface, each rib of the first set of protruding ribs having a first axial portion and a second axial portion; and
    wherein the first axial portion of each rib has a radial thickness and the second axial portion of each rib has a radial thickness, the radial thickness of the first axial portion being different than the radial thickness of the second axial portion.

2. The strut bearing unit according to claim 1, wherein the radial thickness of the first axial portion of each rib of the first set of protruding ribs is less than the radial thickness of the second axial portion of each rib of the first set of protruding ribs.

3. The strut bearing unit according to claim 1, wherein the radial thickness of each first axial portion of the first set of protruding ribs is dimensioned for centering the top mount during assembly.

4. The strut bearing unit according to claim 1, wherein the radial thickness of each second axial portion of the first set of protruding ribs is dimensioned for fastening the top mount in a non-rotating manner after assembly.

5. The strut bearing unit according to claim 4, wherein the second axial portions of the first set of protruding ribs provide an interference fit with the top mount after assembly.

6. The strut bearing unit according to claim 1, wherein each rib of the first set of protruding ribs is deformable.

7. The strut bearing unit according to claim 1, wherein the upper cup further includes a second set of protruding ribs formed on the inner cylindrical surface of the upper cup, each rib of the first set of protruding ribs having an axial length and each rib of the second set of protruding ribs having an axial length, the axial length of each rib of the second set of protruding ribs being less than the axial length of each rib of the first set of protruding ribs.

8. The strut bearing unit according to claim 7, wherein each rib of the second set of protruding ribs has a radial thickness which is dimensioned for centering the top mount during assembly.

9. The strut bearing unit according to claim 7, wherein the first set of protruding ribs and the second set of protruding ribs are uniformly distributed around the circumference of the inner cylindrical surface of the upper cup.

10. The strut bearing unit according to claim 9, wherein the first set of protruding ribs and the second set of protruding ribs are arranged alternating.

11. The strut bearing unit according to claim 9, wherein the first set of protruding ribs are arranged in groups of at least two ribs and the second set of protruding ribs are arranged in groups of at least two ribs, each group of the first set of protruding ribs being arranged circumferentially between a separate pair of groups of the second set of protruding ribs.

* * * * *